| United States Patent [19] | [11] | 4,025,314 |
|---|---|---|
| Sadowski et al. | [45] | May 24, 1977 |

[54] NICKEL-CHROMIUM FILLER METAL

[75] Inventors: Edward Peter Sadowski, Ringwood, N.J.; Piyush Champakal Shah, Ahmedabad, India

[73] Assignee: The International Nickel Company, Inc., New York, N.Y.

[22] Filed: Dec. 17, 1975
(Under Rule 47)

[21] Appl. No.: 641,687

[52] U.S. Cl. .................. 428/680; 75/171; 228/263; 428/636

[51] Int. Cl.² ............... B32B 15/00; C22C 19/05

[58] Field of Search ............ 75/171; 29/194; 228/263

[56] References Cited

UNITED STATES PATENTS

| 2,159,806 | 5/1939 | Lenz et al. ............... 75/171 X |
| 2,809,139 | 10/1957 | Bloom et al. ............. 75/171 X |
| 3,113,021 | 12/1963 | Witherell ................. 75/171 |
| 3,306,740 | 2/1967 | Wyman et al. ............ 75/176 |
| 3,519,419 | 7/1970 | Gibson et al. ............ 75/171 |
| 3,627,511 | 12/1971 | Taylor et al. ............ 75/171 X |
| 3,635,769 | 1/1972 | Shaw ..................... 75/171 X |
| 3,640,777 | 2/1972 | Taylor et al. ............ 148/13 |
| 3,676,110 | 7/1972 | Mito et al. .............. 75/171 X |
| 3,718,443 | 2/1973 | Faulkner et al. ........... 29/194 X |
| 3,787,202 | 1/1974 | Mueller et al. ............ 75/171 X |

*Primary Examiner*—L. Dewayne Rutledge
*Assistant Examiner*—E. L. Weise
*Attorney, Agent, or Firm*—Walter A. Petersen; Ewan C. MacQueen; Raymond J. Kenny

[57] ABSTRACT

A nickel-chromium-titanium filler alloy for inert gas shielded-arc welding of 50% Cr, 50% Ni type alloys. The wrought alloy is characterized by a single phase austenitic microstructure and contains, by weight, from about 42 to about 46% chromium, from about 0.1 to about 1.8% titanium, from about 0.01 to about 0.1% carbon, and up to about 0.1% magnesium with the balance, apart from incidental elements, essentially nickel. The alloy provides sound welds having a two phase microstructure that afford elevated temperature strength and corrosion resistance equal to that afforded by base metals of the 50% Cr, 50% Ni type.

11 Claims, No Drawings

NICKEL-CHROMIUM FILLER METAL

The present invention relates to nickel-chromium welding materials and, more particularly, to a nickel-chromium-titanium filler alloy for inert gas shielded-arc welding of 50% Cr, 50% Ni type alloys.

50% Cr, 50% Ni alloys have been known for many years, first as a cast alloy and more recently as a wrought alloy. The advent of the 50% Cr, 49% Ni, 1% Ti wrought version has increased the number of areas in which this type of alloy can be used. With this growth has come the need for an economical joining method. These alloys may be readily joined with a number of existing commercial welding materials; however, the properties of welds made with these fillers are generally unsatisfactory since the weld properties are inferior to those of the base alloy. Although the 50% Cr, 50% Ni alloy cannot be readily prepared in wire form, welds made with exactly matching composition filler wire, prepared by a special casting technique, show a propensity to weld cracking. Thus, a need exists for a welding material that can be prepared in wire form and is capable of being used to produce sound joints under conditions imposing severe restraint. Such welds must also possess suitable strength and corrosion-resisting properties.

It has now been discovered that sound welds can be made in the 50% Cr, 50% Ni alloys with a special composition, wrought, nickel-chromium-titanium filler alloy. The special filler composition is suitable for inert gas shielded-arc welding of 50% Cr, 50% Ni alloys in a variety of shapes and forms and is also useful for welding dissimilar alloys.

It is an object of the invention to provide a special composition filler alloy suitable for producing sound inert gas shielded-arc welds in the 50% Cr, 50% Ni alloys.

It is another object of the invention to provide a filler alloy that can be readily produced in wrought form.

Still another object of the invention is to provide sound, strong, ductile, corrosion-resistant substantially crack-free weld deposits in 50% Cr, 50% Ni alloys as well as dissimilar metals.

Other objects and advantages will become apparent from the following description.

Generally speaking, the present invention contemplates an inert gas shielded-arc filler alloy containing, by weight, from about 42 to about 46% chromium, from about 0.1 to about 1.8% titanium, from about 0.10 to about 0.1% carbon, and up to about 0.1% magnesium, with the balance, apart from incidental elements, essentially nickel; said alloy being characterized by an austenitic microstructure.

It is preferred that the filler alloy contain from about 0.3 to about 1% titanium and that the carbon content be in the range of about 0.02 to about 0.1% in order to provide optimum hot and cold workability as well as weldability. Furthermore, it is preferred that the alloy be produced by a vacuum melting technique so that it will not contain more than about 0.05% each of oxygen and nitrogen and similarly that care be taken in selecting melting stock, particularly chromium, to avoid unnecessary pick-up of nitrogen. Other elements normally associated with standard deoxidation practice for high nickel alloys may also be present; however, it is preferred that the manganese, silicon and aluminum contents not exceed about 0.2% each and the magnesium content not exceed about 0.06% since larger amounts of these elements could lead to weld cracking or deterioration of elevated temperature properties.

The chromium content of the alloy should be maintained in the range of 42 to 46% to provide the required corrosion resistance, elevated temperature strength and ability to be hot and cold worked to wire form. Alloys containing more than about 46% chromium can be hot worked from 2300° to 2000° F or lower, however, undesirable edge cracking results. Cold working of alloys containing more than 46% chromium is to be avoided since at room temperature, such alloys contain the two phases, austenite and alpha chromium, particularly when the alloy has a high titanium content. The presence of two phases, rather than just austenite, is deemed responsible for cracking during hot and cold working. For example, in the commercial, wrought, 50% Cr, 49% Ni, 1% Ti alloy, it is necessary to use extensive annealing treatments in order to make even experimental quantities of wire because the alloy contains two phases. Annealing heat treatments must be used after every reduction of at most about 30%. This method for producing wire is not commercially useful and for this reason alone a wrought, essentially matching composition filler alloy is not available. Therefore, it is most important that the presence of a second phase such as alpha chromium be avoided. Thus, alloys containing less than 46% chromium, and containing just austenite, can be readily hot and cold worked and do not exhibit surface cracking or splitting.

Weld deposits made with alloys containing less than about 42% chromium, although corrosion resistant, do not have sufficient resistance to corrosive attack to be compatible with the base alloy. In addition, such lower chromium alloys have somewhat lower strength than the 50% Cr, 50% Ni base alloys.

The principle difference between the cast and the wrought versions of the 50% Cr, 50% Ni alloys is the presence of titanium in the wrought alloy. Titanium is also contained in the filler alloy of this invention, but preferably in smaller quantities, to provide resistance to weld cracking. This element is beneficial to weld pool deoxidation and promotes sound welds by acting to promote the second phase, alpha chromium within the weld deposit. In this regard, a small but effective amount, e.g., 0.1% and preferably 0.3%, is required.

Although the effect of titanium is not fully understood and without being bound to any particular theory, titanium is believed to shift the gamma solvus toward lower chromium contents thereby requiring higher solution temperatures to provide a single phase structure necessary for hot and cold workability. Thus, excessive quantities of titanium, e.g., more than about 1% and particularly in alloys having chromium in amounts approaching about 46%, can be responsible for the presence of the second phase, alpha chromium, in the austenite matrix which can cause cracking during both the hot working and the cold working operations. However, in welds made with the subject wrought filler wire, it is beneficial to have a small quantity of alpha chromium present in the weld structure. As in austenitic stainless steels, this small quantity of a second phase promotes freedom from weld cracking. The alpha chromium that beneficially forms in the weld deposit is believed to be related to segregation of titanium to interdendritic and intergranular sites. Concentrations of titanium in these locations is believed responsible for the beneficial formation of alpha chromium within the welded deposit which serves to substantially limit weld cracking susceptibility.

Corrosion tests have shown that titanium is more effective than chromium in lowering the corrosion rate. For this additional reason titanium is essential in the filler alloy.

A minimum carbon content of 0.01% or even 0.02%, is desired to provide adequate cold workability in the wrought alloy. Alloys containing less than this small amount are prone to edge cracking during cold rolling and tensile failure during the drawing operation. An upper limit of 0.1% is desirable to avoid the formation of excessive quantities of titanium and chromium carbides. Formation of titanium carbide can act to lower the effective titanium content of the filler and thereby serve to adversely affect weld soundness characteristics. Thus, according to the invention, the titanium is uncombined titanium and alloys containing high carbon should contain proportionately higher titanium. The titanium content should preferably be at least about 6 times the carbon content of the alloy. Similarly, chromium carbide formation causes chromium depletion at the grain boundaries and can lead to susceptibility to corrosive attack.

Similarly, it is desirable to control the nitrogen content of the filler alloy in order to prevent the formation of chromium nitrides. This can be accomplished by selecting low nitrogen charge materials and melting under vacuum. It is preferred that the nitrogen content of the filler be maintained below about 0.08% and preferably below about 0.05%.

Although not absolutely essential to the filler alloy of this invention, a small magnesium addition has been found of value for improving the hot working characteristics. No more than about 0.1% and preferably not more than about 0.06% magnesium should be added since, excessive quantities can result in hot shortness during the hot working operation. When magnesium deoxidation is used, it is preferred that the carbon content of the alloy be above about 0.02% to attain cold reductions in excess of about 50% without cracking. Accordingly, it is preferred that magnesium be present in a small amount, e.g., 0.005%, and that the carbon content be above about 0.02% in the presence of this element.

The balance of the alloy consists of nickel in quantities generally ranging from about 52 to about 58%. This element in combination with the other elements contained in the alloy is responsible for imparting the desirable austenitic (face-centered-cubic) structure to the matrix as well as other advantageous physical and metallurgical properties.

As will be understood by those skilled in the art, the term "balance" or "balance essentially" used herein in referring to the nickel content does not exclude the presence of other elements such as those commonly present as incidental elements, e.g., deoxidizing and cleansing elements, and impurities normally associated therewith, in small amounts which do not adversely affect the basic characteristics of the alloys. In this connection, the impurities include boron and zirconium which normally should not exceed 0.01% each and sulfur and phosphorus, which should not usually be allowed to exceed 0.02% each. Examples of incidental elements are aluminum, cobalt, columbium, copper, iron, manganese, molybdenum and silicon which can be present in small amounts, e.g., preferably not more than about 0.2% each, in the subject alloys. However, the total amount of elements other than nickel, chromium, titanium, magnesium and carbon should not exceed about 1%.

For the purpose of giving those skilled in the art a better understanding of the invention, the following examples are given.

EXAMPLE I

This example illustrates the hot workability of alloys representative of the filler composition range (1–10) as well as that of alloys (A–E) outside of this range.

Vacuum induction melts of the filler alloy were prepared in a 30–lb. capacity furnace having a magnesia lining. Electrolytic nickel, vacuum grade chromium and 0.05% carbon were heated to 2900° F under vacuum and deoxidized by the addition of a small amount of silicon-manganese master alloy followed by titanium and aluminum. The furnace chamber was back-filled with argon to ½ atmosphere pressure and any additional carbon and magnesium were added. The melts were poured into cast iron molds to produce 4 inch square ingots having the compositions shown in Table I.

TABLE I

| Alloy No. | Composition of Alloys in Weight Percent, Balance Nickel | | | | | | | |
|---|---|---|---|---|---|---|---|---|
| | Cr | Ti | C | Al | Si | Mn | Others | |
| 1 | 42.9 | 0.59 | 0.040 | | | | | |
| 2 | 42.7 | 0.65 | 0.045 | | | | | |
| 3 | 44.3 | 0.37 | 0.015 | | | | | |
| 4 | 45.7 | 0.70 | 0.042 | | | | | |
| 5 | 43.6 | 0.73 | 0.010 | | | | | |
| 6 | 43.6 | 0.72 | 0.050 | | <0.01 | 0.17 | 0.016 | Mg |
| 7 | 42.7 | 0.30 | 0.017 | 0.07 | 0.06 | 0.06 | | |
| 8 | 44.4 | 0.41 | 0.037 | 0.02 | 0.07 | 0.08 | 0.034 | Mg |
| 9 | 42.9 | 1.30 | 0.048 | 0.09 | 0.06 | 0.07 | 0.012 | Mg |
| 10 | 43.7 | 1.33 | 0.019 | 0.10 | 0.06 | 0.07 | 0.015 | Mg |
| A | 49.5 | nil | 0.002 | nil | 0.01 | 0.002 | 0.012 <0.001 | Ce, Zr |
| B | 49.0 | 0.80 | (0.03)* | | | | (0.05)* | Mg |
| C | 45.4 | nil | (0.03)* | | | | (0.05)* (0.05)* | Mg, Zr |
| D | 42.6 | nil | (0.03)* | | | | (0.05)* (0.05)* | Mg, Zr |
| E | 46.4 | 0.59 | 0.012 | 0.09 | 0.08 | 0.05 | 0.008 | Mg |

*Parenthesis indicates nominal composition.

Hot working characteristics were established by examination for cracking. The 4 inch square ingots were soaked for 3 hours at 2300° F, forged to 2 inch square billets without intermediate heating, reheated to 2300°

F for 1 hour and hot rolled to ⅝ inch square bar in 12 passes.

Heats of the preferred compositional range, shown as alloy numbers 1 through 10 in Table I, exhibited excellent hot working characteristics and were readily reduced from 4 inch square ingot to ⅝ inch square bar (Table II). However, alloys A, B and E, representing alloys outside of the invention, exhibited various degrees of susceptibility to cracking during hot working.

TABLE II

| | Workability of Nickel-Chromium Alloys | | | | | |
|---|---|---|---|---|---|---|
| Alloy No. | Cr % | Ti % | C % | Hot Work-ability | Cold Rolling, % Reduction | Cold Drawing, % Reduction |
| 1 | 42.9 | 0.59 | 0.040 | OK | 96 | 65 |
| 2 | 42.7 | 0.65 | 0.045 | OK | 96 | 65 |
| 3 | 44.3 | 0.37 | 0.015 | OK | 96 | 65 |
| 4 | 45.7 | 0.70 | 0.042 | OK | 96 | 65 |
| 5 | 43.6 | 0.73 | 0.010 | OK | 96 | 65 |
| 6 | 43.6 | 0.72 | 0.050 | OK | 96 | 65 |
| 7 | 42.7 | 0.30 | 0.017 | OK | 96 | 65 |
| 8 | 44.4 | 0.41 | 0.037 | OK | 96 | 65 |
| 9 | 42.9 | 1.30 | 0.048 | OK | 96 | 65 |
| 10 | 43.7 | 1.33 | 0.019 | slight cracking | 71 | 65 |
| A | 49.5 | nil | 0.002 | broke up | | |
| B | 49.0 | 0.80 | (0.03) | broke up | | |
| C | 45.4 | nil | (0.03) | OK | 96 | 65 |
| D | 42.6 | nil | (0.03) | OK | 96 | 65 |
| E | 46.4 | 0.59 | 0.012 | slight cracking | | |

Alloy A in Table II, devoid of titanium, and representative of the cast 50% Cr, 50% Ni alloy, could not be suitably hot worked. Alloy B, containing 49% Cr, was susceptible to break-up during the initial hot working operation despite the addition of 0.8% titanium. These results clearly illustrate the difficulty associated with the preparation of a wrought 50% Cr, 50% Ni alloy.

Reducing the chromium content to 45.4%, as in Alloys C and D in Table II, but not adding titanium, resulted in alloys exhibiting acceptable hot workability, but, see Table IV and related text regarding weldability.

Alloy E is very close to the composition of the filler alloy of this invention since it contains 46.4% chromium which is only 0.4% more than the upper limit for chromium. The hot working test showed cracks in the ingot sufficiently deep to preclude grinding for their removal. These examples show that chromium contents below about 46% are required for acceptable hot workability.

EXAMPLE II

This example describes the cold working characteristics of the filler alloy of this invention and also shows the effect of titanium on cold workability.

Cold working tests were conducted on ⅝ inch square bar that had been annealed for 1 hour at 2300° F followed by water quenching. The cold working procedure consisted of 16 passes in a rolling mill having 8 inch diameter rolls followed by additional cold working to 0.12 inch square rod in 13 passes in a rolling mill having 4 inch diameter rolls. Further tests of cold working capability consisted of swaging the 0.12 inch square rod to 0.10 inch round and drawing through five progressively smaller diamond dies to produce 0.062 inch diameter wire. The percent reduction that occurred during each stage of the cold working process was noted. A maximum cold rolling reduction of 96% and a maximum cold drawing reduction of 65% were used. In the results recorded for these tests, when the percent reduction is shown to be less than 96% for cold rolling or 65% for drawing, this represents the maximum reduction after which surface cracking or splitting of the rod or wire occurs. By way of comparison, a 50% Cr, 49% Ni, 1% Ti wrought alloy could only be cold worked about 30% under these conditions before the onset of cracking. Wire from the cold working operations was cleaned to remove surface oxides and residual lubricants prior to use as welding wire.

Alloys 1 through 9 exhibited satisfactory cold rolling and drawing characteristics and could be cold rolled 96% and drawn 65% without exhibiting defects (Table II).

Alloy 10 which is outside the preferred composition range, and containing 1.33% titanium, exhibited satisfactory hot working characteristics, however, during the cold rolling operation, it was susceptible to cracking after 71% reduction (Table II). This somewhat unsatisfactory behavior was attributed in part to the higher titanium content and in part to the low carbon content (0.010% carbon) since Alloy 9 which had essentially the same composition but contained 0.048% carbon, could be satisfactorily cold rolled. Accordingly, it is preferred that the carbon content be above about 0.02% and that the titanium content be below about 1% for cold workability.

EXAMPLE III

This example shows the weldability of the alloys of this invention when used to make welded joints in ⅝ inch thick plate. Commercially melted, wrought 50% Cr, 49% Ni, 1% Ti plate was used for the welding tests reported herein. The composition of the plate is shown in Table III.

TABLE III

| Composition of Commercially Melted, Wrought, 50% Cr, 49% Ni, 1% Ti Base Plate Used for Welding Tests, Weight Percent, Balance Ni | | | | |
|---|---|---|---|---|
| Cr | Ti | C | Si | Fe |
| 50.3 | 1.00 | 0.045 | 0.06 | 0.24 |

⅝ inch thick by 3 inches wide by 8 inch long pieces of plate were prepared for welding by bevelling one of the 8 inch edges at a 60° angle. A 3/32 inch root face was ground on the bevelled edge. Two bevelled plates were set apart ⅛ inch and clamped to a 3 inch thick steel platen to impose restraint. The welds were prepared manually at a travel speed of about 3 inches per minute, using a gas tungsten-arc welding torch having a ⅛ inch diameter tungsten electrode and with an argon flow rate of 25 cubic feet per hour. A total of 16 passes were required to complete the joints at a voltage of about 16 and an amperage of about 190.

The joints were radiographically inspected for soundness and sectioned into ½ inch wide transverse slices. These were ground, polished on a rubber-bonded abrasive wheel, etched with aqua regia and examined for defects at 10 magnifications. Several samples were also examined following metallographic preparation at magnifications up to 500.

Welded joints were prepared with Alloys 1 through 4 and 7 in the 50% Cr, 49% Ni, 1% Ti alloy; and Alloys 5, 6, and 8 were used to weld a dissimilar alloy as shown in Table IV.

TABLE IV

Weldability of Nickel-Chromium Alloys in ⅜" Plate

| Alloy No. | Cr, % | Ti, % | C, % | Result of Examination at 10X | at 500X |
|---|---|---|---|---|---|
| 1 | 42.9 | 0.59 | 0.040 | Entirely Sound | Entirely Sound |
| 2 | 42.7 | 0.65 | 0.045 | Entirely Sound | Entirely Sound |
| 3 | 44.3 | 0.37 | 0.015 | Entirely Sound | Entirely Sound |
| 4 | 45.7 | 0.70 | 0.042 | Entirely Sound | Entirely Sound |
| 5* | 43.7 | 0.73 | 0.010 | Entirely Sound | Entirely Sound |
| 6* | 43.6 | 0.72 | 0.050 | Entirely Sound | Entirely Sound |
| 7 | 42.7 | 0.30 | 0.017 | One 1/32" crack in 6 faces | |
| 8* | 44.4 | 0.41 | 0.037 | Entirely Sound | Entirely Sound |
| C | 45.4 | nil | (0.03) | Severely cracked | |
| D | 42.6 | nil | (0.03) | Severely cracked | |

*Joint in 37% Cr, 18% Fe, Bal. Ni Base Plate

The joints prepared with alloy numbers 1 through 6 and 8 were entirely sound. However, the weld made with alloy number 7 contained one small crack, about 1/32 inch long, in the 6 transverse faces examined. This alloy was considered lean since it contained chromium, titanium and carbon at the low end of the range for the filler alloy of this invention.

Alloys Nos. 5, 6 and 8 which are representative of the preferred composition, were used to prepare welded joints in base alloys nominally containing 37% Cr, 18% Fe, 0.5% Ti, balance nickel (Table IV). The freedom from cracking exhibited in these joints, shows the utility of the filler alloy of this invention for welding metals other than those for which it was originally intended.

Welded joints in the 50% Cr, 49% Ni, 1% Ti base alloy prepared with fillers C and D, which were titanium-free and represented alloys outside the invention, exhibited severe weld cracking. These tests demonstrated the need for titanium in the filler alloy of the invention in order to avoid weld cracking. Comparison of the results obtained on alloy No. 7 with those on alloy No. 2, shows that when the titanium and carbon contents were increased slightly, there was no indication of susceptibility to weld metal cracking. Thus, the results obtained with alloy No. 7 show that alloys having carbon and titanium contents somewhat above the mininum values specified for the alloys of this invention are preferred.

EXAMPLE IV

The tensile properties of welded joints prepared with fillers of the preferred composition are shown in Table V. The tensile properties of the samples prepared from transverse slices cut from the welded joints were equivalent to those exhibited by the 50% Cr, 50% Ni base alloy. Fracture occurred in the weld deposit, however, the tensile values obtained were equivalent to those found for the base alloy. The welds made with alloy Nos. 5 and 6 in the 37% Cr, 18% Fe, Bal. Ni base plate had the same characteristic strength and ductility as found in tests on the 50% Cr, 50% Ni base alloy.

TABLE V

Tensile Properties of Welded Joints

| Alloy No. | Test Temp., °F | 0.2% Y.S., ksi | U.T.S., ksi | El. (in 1"), % | R.A., % | Fracture Location |
|---|---|---|---|---|---|---|
| 2 | 70 | 75.1 | 105.6 | 18.0 | 38.0 | weld |
|   | 1400 | 44.6 | 60.3 |  | 29.0 | weld |
| 3 | 70 | 81.0 | 116.2 | 15.0 | 35.0 | weld |
|   | 1400 | 37.4 | 58.3 | 18.0 | 21.5 | weld |
| 4 | 70 | 76.6 | 109.0 | 18.0 | 45.0 | weld |
|   | 1400 | 41.9 | 56.9 | 13.0 | 15.5 | weld |
| 5 | 70 | 70.6 | 105.4 | 20.0 | 42.0 | weld |
|   | 1200 | 49.2 | 65.4 | 16.0 | 34.0 | weld |
| 6 | 70 | 70.5 | 105.2 | 34.0 | 42.5 | * |
| 7 | 70 | 71.4 | 103.6 | 16.0 | 37.5 | weld |
|   | 1400 | 40.5 | 56.1 | 11.0 | 21.5 | weld |
| Base Alloy | 70 | 72.9 | 149.0 | 19.0 | 24.0 | |
|   | 1400 | 36.6 | 54.3 | 35.0 | 39.5 | |

*Test coupon was all-weld-metal.

EXAMPLE V

The excellent stress rupture properties of weld deposits made with the alloy of this invention are shown in this example. All-weld-metal stress rupture specimens were machined from the welds made with filler alloys No. 6 and No. 8 in 37% Cr, 18% Fe, Bal. Ni base plate. Table VI shows that the stress rupture life of weld deposits was well in excess of published values for 50% Cr, 50% Ni base plate.

TABLE VI

Stress Rupture Properties

| Alloy No. | Stress, psi | Temp., °F | Life, hrs. | Elong (1"), % | R.A., % |
|---|---|---|---|---|---|
| 6 | 15,000 | 1600 | 42 | 4.8 | 9.7 |
| 6 | 9,600 | 1600 | 436 | 5.6 | 5.1 |
| 6 | 7,200 | 1600 | 1471 | 4.8 | 3.5 |
| 8 | 1,500 | 1800 | 6500+(still under test) | | |
| Wrought Base Alloy (1) | | | | | |
|  | 3,000 | 1600 | 100 | | |
|  | 2,000 | 1600 | 1000 | | |
|  | 1,500 | 1800 | 100 | | |
|  | 1,000 | 1800 | 1000 | | |

(1) Alloy Digest, February 1969.

EXAMPLE VI

This example illustrates the corrosion resisting properties of welds made with the filler alloy of this invention. The corrosion resistance of weld deposits was determined in a synthetic coal ash environment. In this test, 0.2 inch diameter by 1 inch long weld metal samples were placed in alumina combustion boats surrounded by tightly packed synthetic coal ash and exposed to flue gas at 1200° F for 240 hours.

The synthetic coal ash contained, in weight percent, 33.6% $Na_2SO_4$, 41.3% $K_2SO_4$, and 25.1% $Fe_2O_3$. The synthetic flue gas contained, in volume percent, 14% $CO_2$, 3.3% $O_2$, 0.26% $SO_2$, balance $N_2$. The flue gas flow rate was 0.5 cc/sec. Table VII shows that welds of the preferred composition exhibit slightly better corrosion resistance than the 50% Cr, 50% Ni base plate. This illustrates the excellent resistance to corrosive attack of weld deposits made with filler metals of the alloy of this invention in environments representative of those anticipated in service.

TABLE VII

| Alloy No. | Weight Loss in Synthetic Coal Ash Weight Loss mg./cm² |
|---|---|
| 2 | 20.5 |
| 3 | 122.6 |

TABLE VII-continued

| Alloy No. | Weight Loss in Synthetic Coal Ash Weight Loss mg./cm² |
|---|---|
| 4 | 48.9 |
| 6 | 105.3 |
| Base Plate | 148.5 |

The present invention is applicable to the welding of 50% Cr, 50% Ni, type alloys and may also be used for joining other alloys such as those containing about 15% to 60% chromium, up to about 40% iron and the balance essentially nickel and supplemental alloying additions. The filler alloy may also be used for overlaying steel and other metals to provide surface layers having enhanced corrosion and oxidation characteristics. The welding material of the present invention is particularly useful to the Chemical and Power Industries where it will find application in the welding of such items as reactor vessels for treating paper pulping liquids, oil refinery heaters, nitric acid handling equipment, incinerator components, metallurgical heat treatment furnaces, residual fuel oil fired heaters, direct fired baffles, superheater tube support shields and etc.

Certain alloys of compositions similar to those shown herein and known to exhibit superplastic behavior, i.e., elongation in excess of about 200% in elevated temperature tensile tests and characterized by a two phase microstructure coupled with ultrafine grain size, have been described by others. The alloys of the present invention are distinct from the superplastic alloys in that they are intentionally worked in the single phase condition. Superplastic behavior is not desired in the filler alloy of this invention during processing.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A wrought inert gas shielded-arc filler alloy consisting essentially of, by weight, from about 42 to about 46% chromium, from about 0.1 to about 1.8% titanium, from about 0.01 to about 0.1% carbon, and up to about 0.1% magnesium, with the balance, apart from incidental elements, nickel; said alloy being characterized by an austenitic microstructure and capability for being hot and cold worked to wire form.

2. A wrought inert gas shielded-arc filler alloy in accordance with claim 1, containing from about 0.3 to about 1% titanium.

3. A wrought inert gas shielded-arc filler alloy in accordance with claim 1, containing at least about 0.02% carbon.

4. A wrought gas shielded-arc filler alloy in accordance with claim 1, containing from about 0.005 to about 0.06% magnesium.

5. A wrought inert gas shielded-arc filler alloy in accordance with claim 1, containing in the presence of at least about 0.005% magnesium, a carbon content above about 0.02%, and from about 0.3 to about 1% titanium.

6. A method for welding a 50% Cr, 50% Ni type alloy with a filler alloy which comprises: using as said filler alloy a chromium-nickel-titanium alloy in which the chromium content is from about 42 to about 46%, the titanium content is from about 0.1 to about 1.8%, the carbon content is from about 0.01 to about 0.1%, and up to about 0.1% magnesium, with the balance, apart from incidental elements, essentially nickel, said alloy being characterized by an austenitic microstructure; and thereafter arc welding said 50% Cr, 50% Ni type alloy with said filler alloy under an inert gas whereupon sound, ductile, corrosion-resistant, oxidation-resistant, substantially crack-free weld deposits are obtained.

7. The method for welding a 50% Cr, 50% Ni alloy as defined in claim 6, wherein said filler alloy contains from about 0.3 to about 1% titanium.

8. A method for welding a 50% Cr, 50% Ni alloy as defined in claim 6, wherein said filler alloy contains at least about 0.02% carbon.

9. A method for welding a 50% Cr, 50% Ni alloy as defined in claim 6, wherein said filler alloy contains in the presence of at least about 0.005% magnesium, a carbon content above about 0.02% and from about 0.3 to about 1% titanium.

10. A welded structure, said structure being comprised of at least one member that is a 50% Cr, 50% Ni alloy and a weld deposit having a two phase microstructure, said weld deposit being prepared with a filler alloy characterized by a single phase microstructure and containing from about 42% to about 46% chromium, from about 0.1 to about 1.8% titanium, from about 0.01 to about 0.1% carbon, and up to about 0.1% magnesium with the balance, apart from incidental elements, essentially nickel.

11. A welded structure as defined in claim 10 wherein said filler alloy contains from about 0.3 to about 1% titanium, at least about 0.02% carbon, and up to about 0.06% magnesium.

* * * * *